(12) United States Patent
Emerson

(10) Patent No.: US 8,282,540 B2
(45) Date of Patent: Oct. 9, 2012

(54) CENTRIFUGE WITH POLYMERIZING ENERGY SOURCE

(75) Inventor: Jane Emerson, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 124 days.

(21) Appl. No.: 12/825,021

(22) Filed: Jun. 28, 2010

(65) Prior Publication Data

US 2010/0267539 A1 Oct. 21, 2010

Related U.S. Application Data

(60) Division of application No. 11/933,871, filed on Nov. 1, 2007, now Pat. No. 7,775,962, which is a continuation-in-part of application No. 11/499,136, filed on Aug. 3, 2006, now Pat. No. 7,810,721.

(60) Provisional application No. 60/707,299, filed on Aug. 10, 2005.

(51) Int. Cl.
*B04B 1/00* (2006.01)
*B04B 13/00* (2006.01)
*B01D 11/00* (2006.01)
*B03D 1/001* (2006.01)
*C08F 2/50* (2006.01)
*B01L 99/00* (2010.01)
*A01N 1/02* (2006.01)

(52) U.S. Cl. ....... 494/43; 210/511; 210/512.3; 210/516; 210/781; 210/782; 252/60; 522/6; 422/401; 422/402; 435/2

(58) Field of Classification Search .................. 210/781, 210/782, 789; 494/37; 525/444
See application file for complete search history.

(56) References Cited

U.S. PATENT DOCUMENTS

| | | |
|---|---|---|
| 4,015,773 A | 4/1977 | Thylefors |
| 4,077,564 A | 3/1978 | Thylefors |
| 4,284,616 A | 8/1981 | Solbakken et al. |
| 4,285,701 A | 8/1981 | Schlenker |
| 4,336,039 A | 6/1982 | Sohre |
| 4,373,941 A | 2/1983 | Lagelbauer |
| 4,383,914 A | 5/1983 | Kizior |
| 4,416,767 A | 11/1983 | Jordan |
| 4,460,687 A | 7/1984 | Ehnstrom |
| 4,493,768 A | 1/1985 | Kubr et al. |
| 4,493,769 A | 1/1985 | Paschedag et al. |
| 4,537,599 A | 8/1985 | Greenwald, Sr. |
| 4,581,009 A | 4/1986 | Kramer |
| 4,769,145 A | 9/1988 | Nakajima |
| 4,820,539 A | 4/1989 | Lehmann et al. |
| 4,886,530 A | 12/1989 | Dussourd |
| 4,911,703 A | 3/1990 | Lysaght et al. |

(Continued)

FOREIGN PATENT DOCUMENTS

WO WO2005011495 2/2005

(Continued)

*Primary Examiner* — Krishnan S Menon
*Assistant Examiner* — Dirk Bass
(74) *Attorney, Agent, or Firm* — Fish & Associates, PC

(57) ABSTRACT

Methods for using a centrifuge are presented. A vessel containing a sample and a separator substance is placed within a centrifuge. Upon sufficient centrifugation, the sample separates into two or more fractions separated by the separator substance. The centrifuge exposes the separator substance to a sufficient energy to polymerize the separator substance to produce a hardened barrier between the fractions.

14 Claims, 2 Drawing Sheets

U.S. PATENT DOCUMENTS

| | | | |
|---|---|---|---|
| 4,990,265 A | 2/1991 | Tenthoff | |
| 5,176,616 A | 1/1993 | Schlip et al. | |
| 5,211,821 A | 5/1993 | Jacobson | |
| 5,221,006 A | 6/1993 | Plumlee et al. | |
| 5,232,437 A | 8/1993 | Lysaght et al. | |
| 5,325,172 A | 6/1994 | Kataoka et al. | |
| 5,454,519 A | 10/1995 | Luck | |
| 5,460,717 A | 10/1995 | Grimwood et al. | |
| 5,482,634 A | 1/1996 | Goerlach-Doht et al. | |
| 5,484,521 A | 1/1996 | Kramer | |
| 5,522,510 A | 6/1996 | Luttrell et al. | |
| 5,553,591 A | 9/1996 | Yi | |
| 5,554,343 A | 9/1996 | Wade | |
| 5,596,150 A | 1/1997 | Arndt et al. | |
| 5,646,263 A | 7/1997 | Ekenberg et al. | |
| 5,720,705 A | 2/1998 | Inge et al. | |
| 5,733,239 A | 3/1998 | Inge et al. | |
| 5,741,423 A | 4/1998 | Bates et al. | |
| 5,762,598 A | 6/1998 | Spragg et al. | |
| 5,968,018 A | 10/1999 | Freeman et al. | |
| 6,146,012 A | 11/2000 | Nakamura | |
| 6,248,844 B1 | 6/2001 | Gates et al. | |
| 6,265,593 B1 | 7/2001 | Best et al. | |
| 6,342,389 B1 | 1/2002 | Cubicciotti | |
| 6,458,533 B1 | 10/2002 | Felder et al. | |
| 6,465,256 B1 | 10/2002 | Iskra | |
| 6,469,888 B1 | 10/2002 | Otsui et al. | |
| 7,211,037 B2 | 5/2007 | Briggs et al. | |
| 7,465,398 B1 | 12/2008 | Robert et al. | |
| 2002/0147094 A1* | 10/2002 | Dolecek | 494/9 |
| 2005/0051466 A1* | 3/2005 | Carter et al. | 210/94 |
| 2006/0160025 A1 | 7/2006 | Lungu | |
| 2006/0160915 A1 | 7/2006 | Fuchs et al. | |

FOREIGN PATENT DOCUMENTS

| | | |
|---|---|---|
| WO | WO2007139018 | 12/2007 |

* cited by examiner

CENTRIFUGE WITH POLYMERIZING ENERGY SOURCE

This application is a division of co-owned, pending U.S. application Ser. No. 11/933,871 filed Nov. 1, 2007 which is a continuation-in-part of U.S. application Ser. No. 11/499,436 filed Aug. 4, 2006 which claims priority to U.S. provisional application Ser. No. 60/707,299 filed Aug. 10, 2005. These and all other extrinsic references are incorporated herein by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is separation technologies.

BACKGROUND

Centrifuges are used throughout the world to separate fractions of blood and other fluids. Some centrifuges include energy sources for imparting ultraviolet, vibrational or other energies to the sample for various purposes, including sterilization. For example, both U.S. patent application No. US2006/0086675 and U.S. Pat. No. 7,211,037 teach using a centrifuge and ultraviolet light to decontaminate samples.

Co-owned, co-pending U.S. applications, U.S. Ser. No. 11/499,436 titled "Photopolymer Serum Separator" (the '436 application) and U.S. Ser. No. 11/933,839 titled "Collection Tubes Apparatus, Systems, and Methods" (the "839" application), teach polymerizing a separator substance after centrifugation, which could conceivably be accomplished with one or more of the prior art centrifuges. But it appears that no one has ever used centrifuges for that purpose, with respect to separation of blood or any other liquid.

Thus, there is still a need for methods of using centrifuges as energy sources that help in maintaining separation of different fractions in a sample.

SUMMARY OF THE INVENTION

The present invention provides apparatus, systems and methods in which a centrifuge includes an energy source that used to polymerize a separator substance.

In a preferred embodiment, a vessel containing the separator substance and a liquid sample are disposed within a centrifuge for centrifugation. Once the sample separates into at least two fractions, an energy source associated with the centrifuge exposes the tube contents to a polymerizing energy, which causes the separator substance to form a hardened barrier between the fractions.

Various objects, features, aspects and advantages of the inventive subject matter will become more apparent from the following detailed description of preferred embodiments, along with the accompanying drawings in which like numerals represent like components.

DETAILED DESCRIPTION

Figure 1:
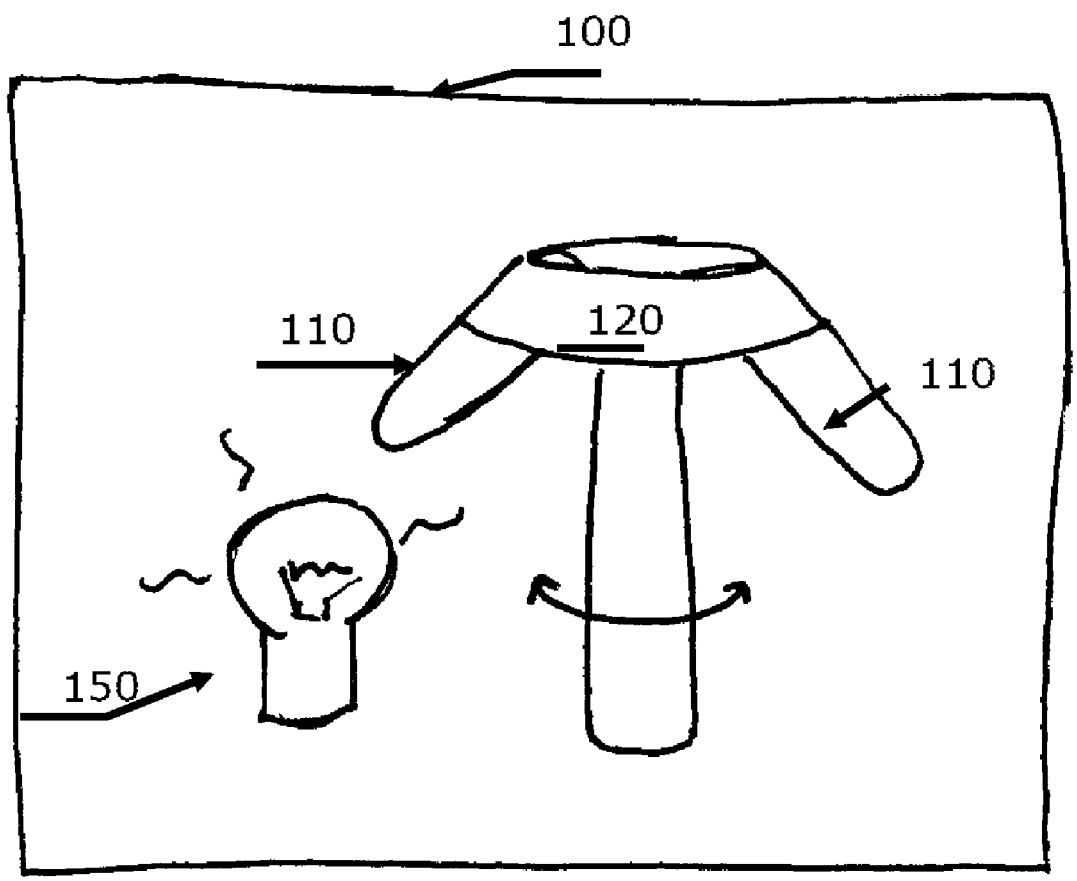
FIG. 1 is a side view of a centrifuge having an energy source used to trigger polymerization of a separator substance.

FIG. 1 a centrifuge 100 generally comprises a rotor 120 having one or more of tube holder 110 and an energy source 150.

A user collects a blood sample in a collection tube having the separator substance. The user places the tube in tube holder 110 and centrifuges the sample by rotating rotor 120. When desired, the tube is exposed to energy source 150 to harden the separator substance; usually after separation. In the presented example, tube holder 110 and rotor 120 are substantially transparent to energy source 150 to ensure the separator substance is properly exposed to energy source 150.

Energy source 150 can produce any suitable type or amount of energy. Preferred energy sources include a UV light source providing light having a wavelength in the range from 10 nm to 450 nm, and more preferably in the range from 250 nm to 400 nm. Alternative contemplated energy sources include those that provide energy from other parts of the electromagnetic spectrum, particle radiation, thermal radiation, vibration, or other sources that can initiate polymerization.

In preferred embodiments, exposure to an energy source that triggers polymerization does not adversely affect characteristics of the sample. For example, M1L1A1 hardens within 10 seconds ensuring the temperature of a whole blood sample changes little during exposure. Preferably, the temperature changes by less than 10 degrees Celsius during polymerization; more preferably by less than 5 degrees Celsius. Short exposure times ensures the sample will maintain appropriate pigmentation levels, gas levels, temperatures, protein levels, or other characteristics associated with the sample.

Some embodiments include automating whole blood separation processes through the use of a centrifuge. Once the blood is separated after centrifugation, the tubes are removed and exposed to an energy source robotically, or more preferably, centrifuge 100 automatically exposes separator substance to energy source 150 which can be located within centrifuge 100.

In a preferred embodiment, centrifuge 100 can be adapted to assist in automating blood separation. For example, centrifuge 100 can include a processing unit to run a program that controls an intensity level of energy source 150 or the duration of exposure to energy source 150. Furthermore, once a user disposes a tube in centrifuge 100, centrifuge 100 can automatically expose the tube to energy source 150 without requiring additional interaction with the user. It is also contemplated that centrifuge 100 can be adapted with energy source 150 after purchase. For example, a lab could purchase a centrifuge lacking a UV light source and then purchase a UV source, typically as part of a kit, which can be disposed within the centrifuge.

Figure 2:
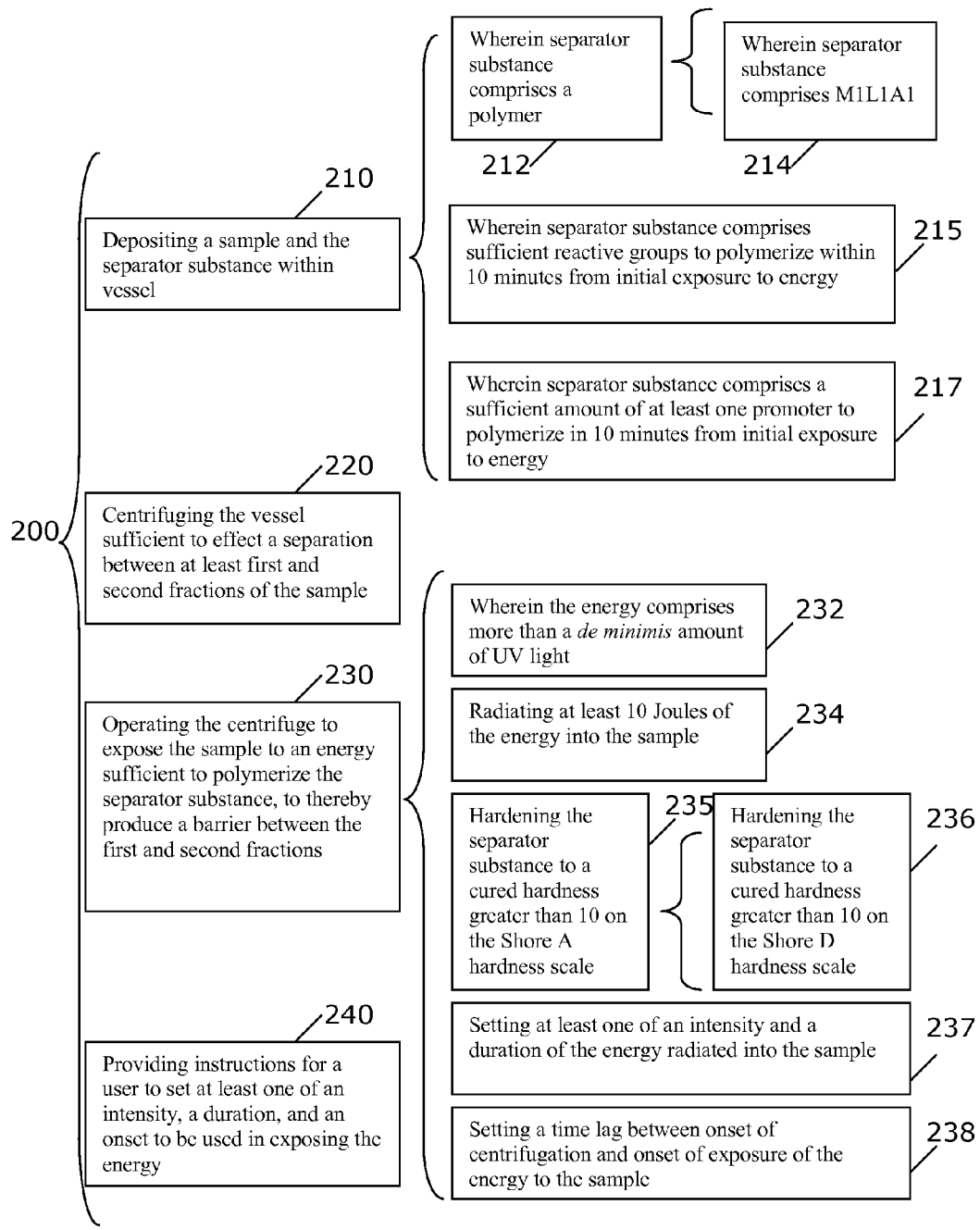
FIG. 2 is a schematic of a method for using a centrifuge to polymerize an separator substance.

FIG. 2 is a schematic of method 200 for using a centrifuge to initiate polymerization of a separator substance. At step 210 a sample and a separation substance are deposited into a vessel. A preferred vessel comprises a tube, although all other containers capable of holding a sample and separator substance are also contemplated.

At step 212, a preferred embodiment employs a polymer as the separator substance and at step 214 an especially preferred embodiment employs a composition derived from M1L1A1 as the separator substance. In some embodiments, the separator substance includes sufficient reactive groups (at step 215) or promoters (at step 217) to polymerize within 10 minutes of initial exposure to an energy source. The separator substance is formulated to have a density that is intermediate between the density of a first fraction of the sample and a second fraction of the sample.

At step 220, the prepared vessel is centrifuged to a sufficient level to separate the sample into a first and second fraction. For example, when the sample is whole blood and is centrifuged, the whole blood separates into a serum fraction and cell containing fraction. The separator substance has a density that allows it to migrate between the two fractions during centrifugation, thereby producing a separation layer. Typically whole blood is centrifuged from about five to about 15 minutes, although the time for separation can vary widely for other types of samples or other analysis purposes.

At step 230, the centrifuge is operated to expose the sample to an energy source supplying sufficient energy to polymerize the separator substance thereby producing a barrier between the two fractions. In a preferred embodiment, at step 232, the energy comprises more than a minimum amount of UV light and preferably, at step 234, radiates the sample with at least 10 Joules of energy.

At step 235, preferably, the separator substance hardens to at least 10 on the Shore A hardness scale, or, alternatively, at step 237 the separator substance hardness to at least 10 on the Shore D hardness scale. The Shore hardness scales are one set of scales used to indicate hardness. Other appropriate hardness scales can also be used, all of which are contemplated.

Operating the centrifuge at step 230 can also include configuring the centrifuge to adjust the energy source. At step 237, one can set the intensity or the duration that the energy source radiates energy into the sample. In addition, at step 238 one can set the time lag between the onset of centrifugation and the onset of exposure. For example, the centrifuge could be programmed to expose the sample to UV light after a preset amount of time after centrifugation is started. Other contemplated energy source adjustments include determining exposure requirements from the tube, adjusting the total energy radiated, pulsing the energy source, adjusting a frequency or a wavelength, adjusting an amplitude, adjusting a temperature, providing alert conditions, or other configurations associated with the energy source.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A centrifuge system comprising:
   A curable separator substance having a density intermediate between at least two fractions of a blood sample;
   A sample containing vessel sized and dimensioned to receive the curable separator substance;
   A vessel holder sized and dimensioned to receive the sample containing vessel;
   A rotor coupled to the vessel holder and configured to centrifuge the sample containing vessel held within the vessel holder; and
   An energy source adapted to expose the curable separator substance in a held, centrifuged vessel to curing energy sufficient to cure the separator substance to solidity.

2. The centrifuge system of claim 1, where the energy source is part of a centrifuge upgrade kit.

3. The centrifuge system of claim 1, further comprising a housing in which is disposed the vessel holder, the rotor, and the energy source.

4. The centrifuge system of claim 1, further comprising a processing unit programmed to control an energy source adjustment affecting the curing energy.

5. The centrifuge system of claim 4, wherein the processing unit is further programmed to adjust a time to expose the curable separator substance.

6. The centrifuge system of claim 4, wherein the processing unit is further programmed to determine exposure requirements from the held vessel.

7. The centrifuge system of claim 4, wherein the processing unit is further programmed to adjust a total energy radiated.

8. The centrifuge system of claim 4, wherein the processing unit is further programmed to adjust a temperature.

9. The centrifuge system of claim 4, wherein the processing unit is further programmed to adjust an alert condition.

10. The centrifuge system of claim 4, wherein the processing unit is further programmed to adjust at least one of an intensity and a duration of exposure.

11. The centrifuge system of claim 1, wherein the energy source comprises a UV light source.

12. The centrifuge system of claim 11, wherein the UV light source provides light with a wavelength between 10 nm and 450 nm.

13. The centrifuge system of claim 11, wherein the UV light source provides at least 10 Joules of energy.

14. The centrifuge system of claim 1, wherein the vessel holder is sized and dimension to receive a collection tube.

* * * * *